Jan. 30, 1940. S. V. ANZALONE 2,188,563.
COOKING UTENSIL
Filed Feb. 28, 1939
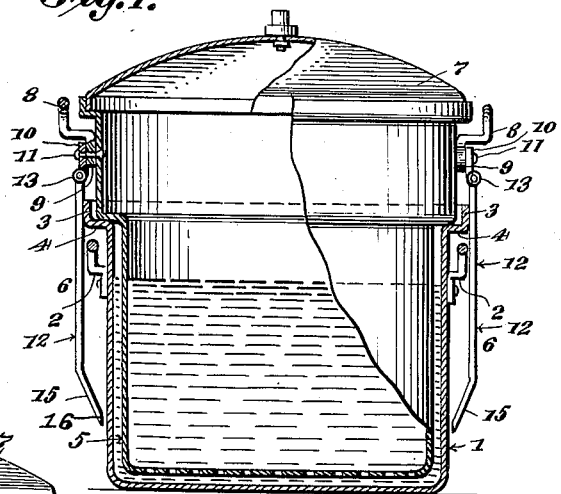
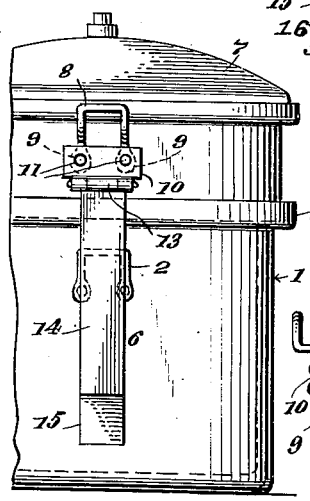
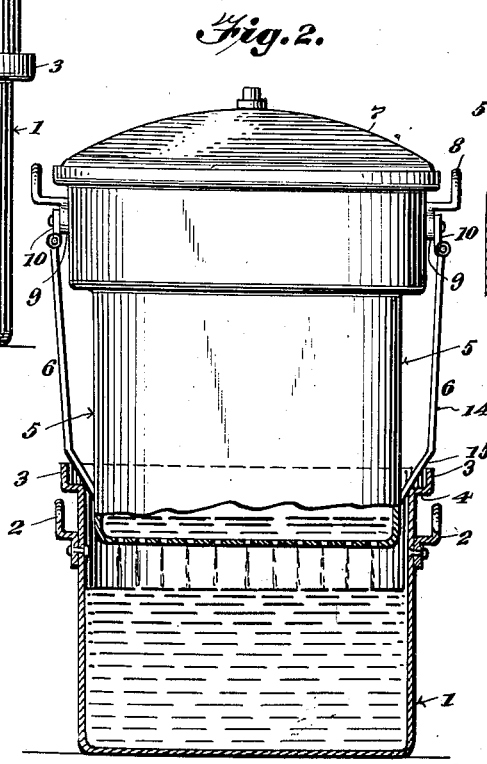
Inventor,
SAMUEL V. ANZALONE.

Patented Jan. 30, 1940

2,188,563

UNITED STATES PATENT OFFICE 2,188,563

COOKING UTENSIL

Samuel V. Anzalone, Watertown, N. Y.

Application February 28, 1939, Serial No. 259,025

3 Claims. (Cl. 53—1)

This invention relates to a cooking utensil.

An object of this invention is the construction of a novel and efficient utensil whereby cooking of food can be satisfactorily accomplished without the close attention of the operator, because stirring is eliminated, and the possibility of burning the food is also avoided.

Another object of the invention is the provision of novel hinge bracket units on the side of the auxiliary receptacle, whereby food in the auxiliary receptacle can be efficiently drained, by reason of the operator raising the auxiliary receptacle upward and permitting the hinge bracket units to operate in their peculiar manner for the purpose desired.

A further object of the invention is the utilization of the handles on the side of the auxiliary receptacle as also the means for spacing and supporting brackets units, in addition to affording the means for the operator to raise and lower the auxiliary receptacle within the primary receptacle.

Further purposes and advantages of this invention will be disclosed hereinafter, for further understanding about the advantages and utility of my improved cooking utensil.

With the foregoing and other objects in view, the invention comprises certain novel constructions, combinations, and arrangements of parts as will be hereinafter fully described, illustrated in the accompanying drawing, and more particularly pointed out in the appended claims.

In the drawing:

Figure 1 is a view partly in vertical section and partly in side elevation of a cooking utensil constructed in accordance with the present invention, while Figure 2 is a similar view, showing the auxiliary receptacle in a raised position.

Figure 3 is a view in side elevation, taken at right angle to Figure 1, and showing part of the utensil broken away.

Figure 4 is a fragmentary perspective view of the cooking utensil.

Referring to the drawing, in which I have shown the preferred embodiment of my invention, 1 designates the primary receptacle, which may be of any convenient configuration, and can be constructed in any size and of any suitable material. This primary receptacle is provided with side handles 2, and with an annular flange 3 on its upper end; this flange 3 is L-shaped in cross-section. The flange 3 is provided with a comparatively wide horizontal shoulder 4 for the purpose hereinafter specified.

The auxiliary receptacle 5 may be of any suitable shape, material or dimensions, provided the receptacle is susceptible of the attachment of the novel hinge bracket units 6, as hereinafter described. The auxiliary receptacle 5 is suitably perforated for allowing drainage of the food that may be contained in said receptacle; this drainage operation is clearly indicated in Figure 2. A cover or lid 7 is on the upper end of the auxiliary receptacle, and this cover is also suitable for placement upon the primary receptacle, as it will rest within the annular flange 3.

The hinge bracket units 6 each comprises a handle 8 which is provided with flattened ends 9 (Fig. 3). Against the outer face of ends 9 is placed a plate 10, and rivets 11 extend through said plate 10 and flattened ends 9, securely retaining these parts together. A hinged bracket 12 is attached to the lower edge of plate 10 by the hinged means 13 (Fig. 4). The hinged bracket 12 comprises a long straight body portion 14, terminating at its lower end in a straight inwardly extending portion 15; the outer end of the inwardly extending portion 15 is preferably bevelled, at 16, for snugly fitting the side of the primary receptacle 5, as clearly seen in Fig. 2. It will, therefore, be seen that each handle 8 performs two functions, to-wit: it affords means for the operator to lift the receptacle, and also means for properly spacing the hinge bracket a sufficient distance away from the side of the auxiliary receptacle so that the hinge bracket will be clear to pass down by the flange 3 when the auxiliary receptacle is lowered into the primary receptacle, for cooking purposes, as clearly seen in Figure 1. The hinged bracket also clears handle 2, with the inwardly extending portion 15 positioned close to the primary receptacle, out of the way, so that it will not catch on any other receptacle that may be positioned close to the utensil, nor is the improved hinged bracket liable to catch on the operator's clothing. The peculiar structure of the hinged bracket also enables it to efficiently "drop" into position, as shown in Fig. 2, with it engaging the annular flange 3, and end 16 pressing snugly against the outer surface of the auxiliary receptacle. This produces an efficient and compact arrangement.

It is possible for the operator to swing the outer ends of the hinged brackets outwardly, to use them as handles if desired, either for sliding the utensil upon its support, or for bodily lifting the auxiliary receptacle to any position with respect to the primary receptacle.

Not only does the comparatively broad annular flange 3 receive the outer ends of the hinged brackets, but it may also receive the lid 7, when the auxiliary receptacle 5 is entirely removed off the primary receptacle.

It is a fact that each hinged bracket unit involves a true "hinge" structure, inasmuch as the upper plate 10 is the fixed leaf of a hinge, and the bracket 12 is the movable or lower leaf of the hinged structure. However, in true combination with the hinge bracket unit, in each instance, is the handle 8, as hereinbefore specifically described.

It is to be understood that in cooking with a conventional type of receptacle, it is found that the greatest nuisance is with the constant stirring that is required to keep food from burning or sticking to the bottom of the receptacle. By cooking certain foods in a cooking utensil as hereinbefore described, the food does not contact with the primary receptacle, so that the food cannot burn even though the liquid is very low, nor is there possibility of the food sticking in the auxiliary receptacle. A great many foods can be satisfactorily cooked in my combination utensil, with far less responsibility being imposed upon the operator.

The auxiliary receptacle acts as an efficient strainer or colander, under various conditions, to the entire satisfaction of the user.

While I have described the preferred embodiment of my invention and illustrated the same in the accompanying drawing, certain changes or alterations may appear to one skilled in the art to which this invention relates during the extensive manufacture of same and I, therefore, reserve the right to make such changes or alterations as shall fairly fall within the scope of the appended claims.

What I claim is:

1. In a cooking utensil, the combination of a primary receptacle provided with an annular rim having a shoulder, an auxiliary receptacle within said primary receptacle, and means attached to the side of said auxiliary receptacle and engaging said shoulder of the rim and also a portion of the auxiliary receptacle contiguous to said rim for holding said auxiliary receptacle in a raised position.

2. In a cooking utensil, the combination of a primary receptacle provided on its upper edge with an annular flange, said annular flange having a wide horizontal shoulder, an auxiliary receptacle within said primary receptacle, said auxiliary receptacle provided on its sides below the top edge of the auxiliary receptacle with handles, said handles being provided with broad flattened ends, a plate against the outer faces of the ends of each bracket, rivets extending through said plate and the flattened ends and the auxiliary receptacle, a hinged bracket fastened to the lower edge of each plate, each hinged bracket comprising an elongated straight body portion terminating at its lower end in an inwardly-extending straight portion, and said last-mentioned straight portion provided with a bevelled edge engaging the side of said auxiliary receptacle with a portion of the lower end of the bracket engaging said wide horizontal shoulder of the flange of the primary receptacle, when the auxiliary receptacle is in a raised position.

3. In a cooking utensil, the combination of a primary receptacle, an auxiliary receptacle, hinge units on said auxiliary receptacle below its upper edge or rim, and each hinge unit comprising an upper leaf fixedly secured to the side of the auxiliary receptacle and a hinged leaf secured to the lower edge of said fixed leaf.

SAMUEL V. ANZALONE.